Feb. 24, 1925.     A. P. BROCKLEBANK     1,527,667
EXPANSION JOINT
Filed April 7, 1921
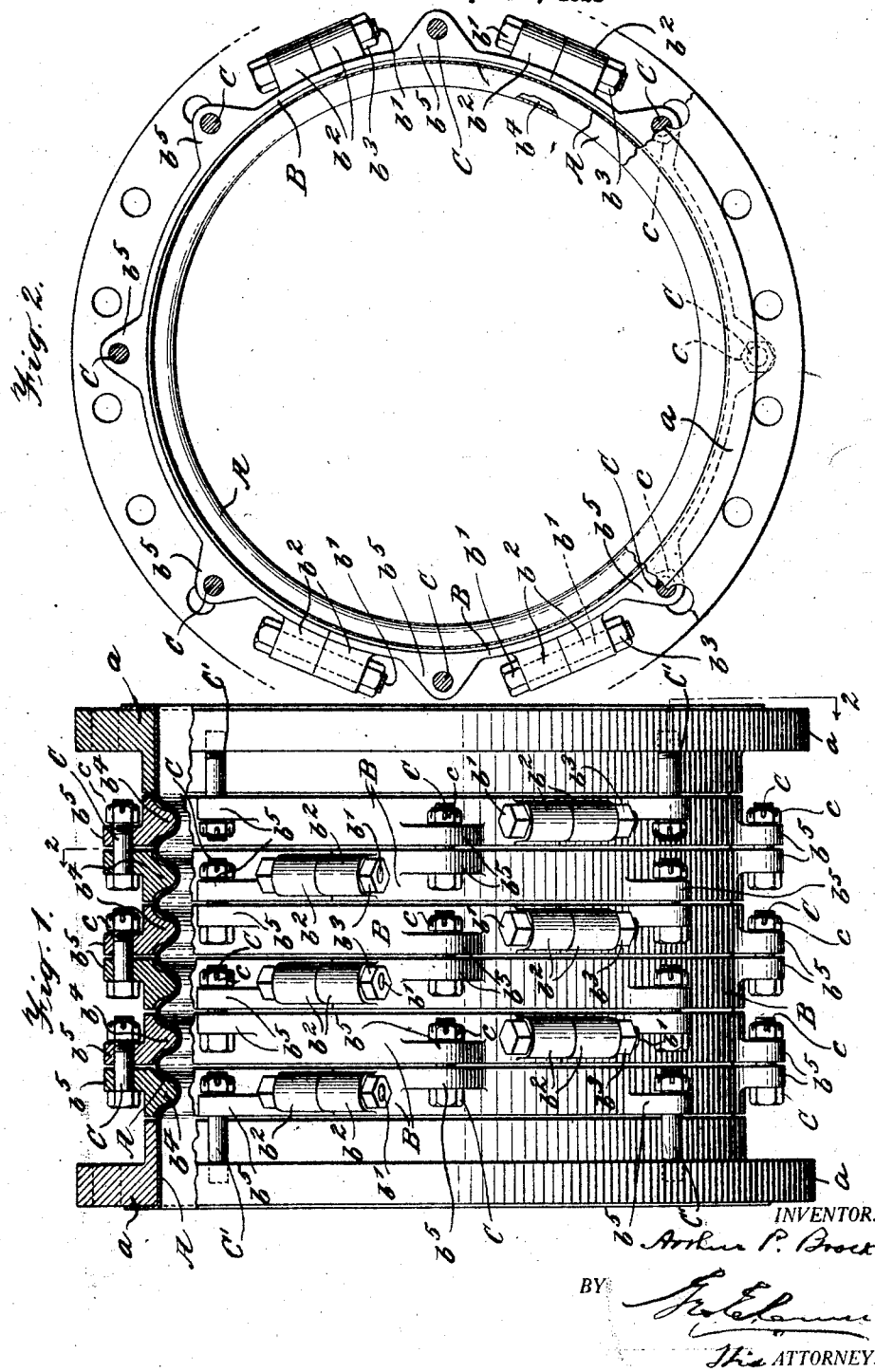
INVENTOR.
Arthur P. Brocklebank
BY
His ATTORNEY.

Patented Feb. 24, 1925.

1,527,007

UNITED STATES PATENT OFFICE.

ARTHUR P. BROCKLEBANK, OF BROOKLYN, NEW YORK, ASSIGNOR TO WHEELER CONDENSER AND ENGINEERING COMPANY, OF CARTERET, NEW JERSEY, A CORPORATION OF NEW JERSEY.

EXPANSION JOINT.

Application filed April 7, 1921. Serial No. 459,469.

*To all whom it may concern:*

Be it known that I, ARTHUR P. BROCKLEBANK, a citizen of the United States, residing in the borough of Brooklyn, city and State of New York, have invented certain new and useful Improvements in Expansion Joints, of which the following is a specification.

My invention relates to expansion joints, and particularly to such joints which embody a corrugated cylinder. The object of my invention primarily, is to control the expansion and contraction of each corrugation and thereby to equalize the expansion and contraction of the cylinder through all of the corrugations. I will describe an expansion joint embodying my invention and then point out the novel features thereof in claims.

In the accompanying drawings, Fig. 1 is a view in side elevations, partly broken away of an expansion joint embodying my invention. Fig. 2 is a cross-sectional view taken on the line 2—2 of Fig. 1.

Similar letters of reference designate corresponding parts in all of the figures.

A designates a corrugated metal cylinder which may be of soft annealed copper. Wrought iron or other metallic flanges $a$ are secured to the ends of the cylinder in order that it may be included in a pipe line in which expansion joints are found desirable.

B designates a series of rings enclosing the exterior of the cylinder A. Each ring is split in order that it may be placed in position on the cylinder, and its ends are connected, as here shown by means of a bolt $b^1$ which passes through openings in the lugs $b^2$, carried on the ends of the ring. A nut $b^3$ is provided for each bolt $b^2$ to hold the ends of the ring together. Each ring is also provided with a projection $b^4$ which preferably has a surface which conforms to a corrugation of the cylinder, and with a plurality of lugs $b^5$ circumferentially arranged on each edge thereof and each lug $b^5$ having an opening. The lugs $b^5$ on the adjacent edges of adjacent rings are in registry and a bolt C extends through each pair of lugs. A nut $c$ is provided for each bolt C for the rings B, intermediate the end rings. The end rings B are supported from the flanges $a$ by means of bolts $C^1$ which extend through the lugs $b^5$ into the flanges $a$. The end rings are permitted movement on the bolts $C^1$ (as will be seen from Fig. 1) during the contraction and expansion of the cylinder A.

It will be observed from Fig. 1 that in effect, the cylinder A is exteriorly surrounded by a cylinder made up of a plurality of separate rings B which is supported from the flanges $a$, and that when any corrugation, or a number of such corrugations have reached the limit of its contraction or expansion by reason of the limited movement of the rings B associated with the corrugations, and the engaging surfaces and connections of such rings B, any further contraction and expansion of the cylinder A must be through the remaining corrugations, thus equalizing the contraction and expansion of the cylinder A throughout its entire length.

As will be seen from the drawings, the arrangement of Fig. 1 will limit the expansion and contraction of the corrugation or corrugations with which its projections $b^4$ are in contact within certain limits. The contraction of such corrugations is limited by the engagement of the adjacent edge portions of the rings B as well as the adjacent lugs $b^5$, while the expansion of the same corrugations is limited by the heads of the bolts C extending through the adjacent lugs $b^5$, and the nuts $c$ carried by such bolts C. Obviously, the amount of expansion and contraction can be predetermined, this being regulated so far as contraction is concerned by the amount of travel of adjacent rings until their adjacent edges and the lugs $b^5$ engage, and so far as expansion is concerned by the travel of the rings until stopped by the heads of the bolts C and nuts $c$.

Therefore, when any one or more corrugations has reached the permissive limit of contraction or expansion, any further contraction or expansion of the cylinder will be resisted at this point or points, and therefore it must be taken up by the other corrugation or corrugations which have not reached their permissive limit, and this is done through the rings B and their adjacent connections and engaging surfaces.

Having thus described my invention, what I claim as new is:—

1. In an expansion joint, the combination with a corrugated cylinder, a plurality of rings each having a portion engaging the adjacent corrugated surface of the cylinder, and means for limiting the relative movement of adjacent rings to thereby limit the expansion and contraction of the adjacent corrugated surface.

2. In an expansion joint, the combination with a corrugated cylinder, a plurality of rings surrounding said cylinder, and each having a portion which conforms to the adjacent corrugated surface of the cylinder, and each ring, co-operating with an adjacent ring to limit the contraction of the adjacent corrugated surface, and means carried by adjacent rings for limiting the expansion of the same corrugated surface.

3. In an expansion joint, the combination with a corrugated cylinder; a plurality of rings on the exterior thereof, each having a portion engaging the adjacent corrugated surface of the cylinder, and each of said rings being free to move into engagement with an adjacent ring to limit the amount of contraction of the adjacent corrugation; and means between adjacent rings to limit the amount of movement when the adjacent corrugation expands and thereby limit the amount of its expansion.

4. In an expansion joint, the combination with a corrugated cylinder; rings in engagement with the corrugations, each of which rings by engagement with an adjacent ring limits the contraction of the adjacent corrugation; and means carried by adjacent rings to limit the expansion of the adjacent corrugation.

5. An expansion joint comprising a corrugated body, rings occupying the corrugations of said body, and couplings connecting adjacent rings with one another arranged and adapted to limit local distortion of the several corrugations and to transmit motion from one to another.

ARTHUR P. BROCKLEBANK.

Witnesses:
RUSSELL W. EVERETT,
PHILIP O. POTTS.